United States Patent [19]

Farmer et al.

[11] 4,198,858
[45] Apr. 22, 1980

[54] METHOD AND APPARATUS FOR SPOT MARKING TIRES

[75] Inventors: Derek Farmer; Christopher Woodfield, both of Birmingham, England

[73] Assignee: Dunlop Limited, England

[21] Appl. No.: 971,255

[22] Filed: Dec. 20, 1978

[30] Foreign Application Priority Data

Jan. 4, 1978 [GB] United Kingdom ............... 132/78

[51] Int. Cl.² .................................... G01M 17/02
[52] U.S. Cl. ................................................ 73/146
[58] Field of Search ...... 73/146; 152/330 D, DIG. 12

[56] References Cited

U.S. PATENT DOCUMENTS 3,518,878  7/1970  Landsness ........................ 73/146
3,631,716  1/1972  Monajjem ......................... 73/146

FOREIGN PATENT DOCUMENTS 932390  7/1963  United Kingdom ................ 73/66

Primary Examiner—Donald O. Woodiel
Attorney, Agent, or Firm—Stevens, Davis, Miller & Mosher

[57] ABSTRACT

A device is provided for marking a rotating pneumatic tire with a spot of paint. To minimize relative movement between the paint applicator and the tire sidewall while they are in contact the applicator travels tangentially to the tire in a V-shaped slot so that as it moves with the tire it also moves toward and away from the tire, contacting the tire as it changes direction at the bottom of the "V".

5 Claims, 2 Drawing Figures

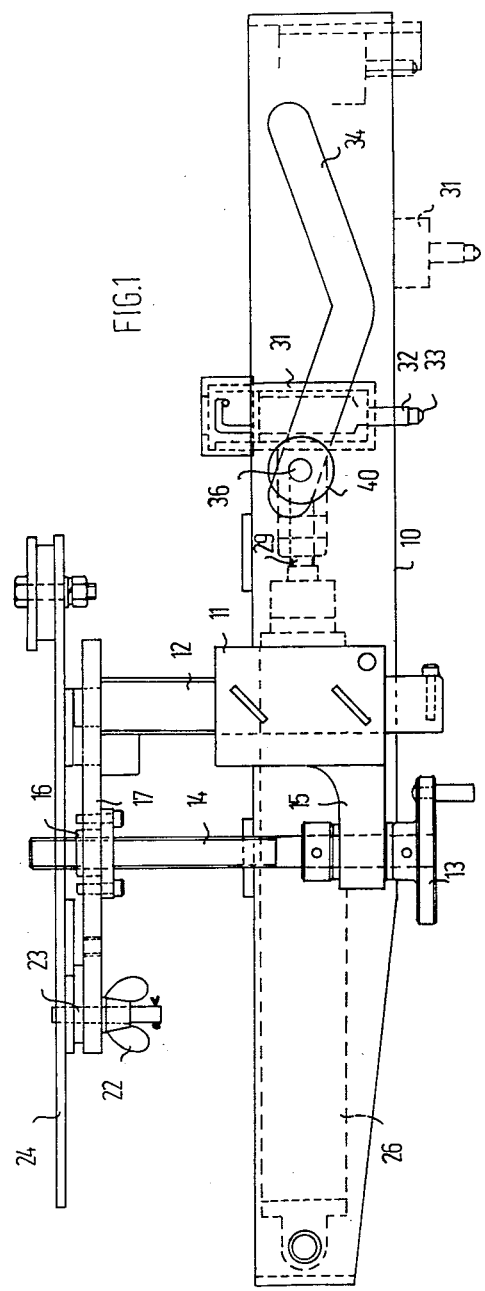

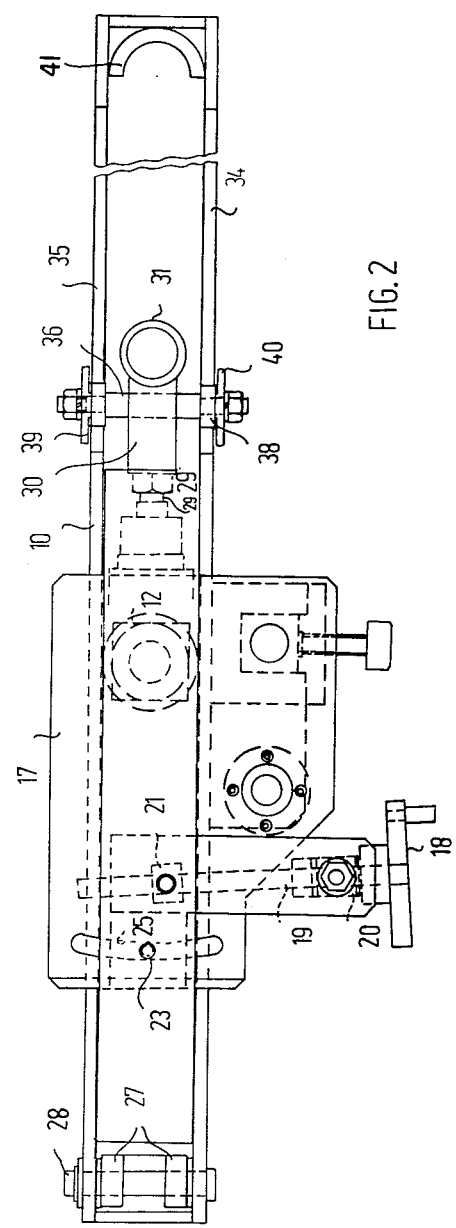

METHOD AND APPARATUS FOR SPOT MARKING TIRES

The present invention relates to an improved method and apparatus for spot marking a pneumatic tyre, by which is meant the application of a spot of a marking substance such as paint to a particular point on a tyre under test to give a visual indication of that point for purposes of subsequent operations carried out on the tyre. For example, the circumferential uniformity of a tyre may be tested and it may be desired to mark the position of maximum imbalance.

In devices proposed in the past for applying a spot of paint to a tyre the problem is presented that because the tyre under test is rotating a spot of paint cannot be applied to it with the required degree of accuracy of a relatively stationary applicator. U.S. Patent No. 3,518,878 discloses an arrangement in which a paint applicator rotates in a sense similar to that of the tyre, so that relative movement between tyre and applicator is reduced at the time of contact, but because the applicator is moving angularly its contact and removal is progressive rather than instantaneous. An object of the present invention is to improve upon prior art proposals both by reducing relative movement between the rotating tyre and the spot applicator at the time they are in contact, and by reducing the period of contact so as to obtain a clearly defined mark.

In accordance with one aspect of the present invention there is provided a method of spot-marking a rotating tyre, comprising moving a marking means in a direction similar to the sense of rotation of the tyre in a generally V-shaped path toward and away from the tyre so as to contact the tyre when changing direction along said path at the nearest point of the path to the tyre.

Preferably the tyre is rotated about a vertical axis, the said path is in a vertical plane tangential to the tyre, and the marking means is maintained in a generally upright attitude throughout travel along said path.

In accordance with another aspect of the present invention there is provided apparatus for carrying out the method defined in the two preceding paragraphs, the apparatus comprising marking means, means for moving the marking means in a direction similar to the sense of rotation of the tyre and guidance means for guiding the marking means to move in a generally V-shaped path toward and away from the tyre during its movement in said direction. The guidance means may comprise a V-shaped slot in a beam carrying the marking means, and follower means trapped in the slot and connected to the marking means, the means for moving the marking means being adapted to displace the marking means longitudinally of the beam whereby it also moves transversely of the beam as the follower moves along the slot.

In accordance with yet another aspect of the present invention apparatus for spot marking a pneumatic tyre comprises a marking device which includes a spring-loaded ball valve arranged to be displaced when the device is brought into contact with the tyre to discharge paint from a reservoir behind the ball valve.

A preferred embodiment of the present invention will now be described with reference to the accompanying drawings, in which:

FIG. 1 is a side elevation, and

FIG. 2 is a plan view, partly broken away, of marking apparatus in accordance with the invention.

The marking apparatus illustrated is used in connection with means (not shown) mounting a pneumatic tyre to rotate about a vertical axis, apparatus (not shown) for determining a point on the uppermost sidewall of the rotating tyre which is to be marked and control means (not shown) for actuating the apparatus illustrated to apply a spot mark to the tyre at the selected point. All of the apparatus referred to and not illustrated is of a kind known per se.

The apparatus of the invention illustrated comprises a hollow beam 10 which is to extend generally tangentially to the underlying rotating tyre to be marked. The beam 10 is supported in a horizontal attitude by a central bush 11 surrounding a vertical column 12 and a hand wheel 13 fixed relative to a threaded shaft 14 and engaging under a flange 15 integral with the bush 11 and beam 10. At its upper end, threads on the shaft 14 engage a nut 16 fixed relative to a first support plate 17 from which the column 12 depends. By this arrangement, by rotating the hand wheel 13 the vertical position of the beam 10 can be adjusted, the bush 11 moving up and down the fixed column 12.

In addition to this vertical adjustment facility the angular orientation of the beam 10 in the horizontal plane can be changed by operating a hand wheel 18 (FIG. 2) which is fixed to a threaded shaft 19 fixed relative to a collar 20 and threadedly engaging a nut 21. The nut 21 and collar 20 are pivotally secured respectively to the plate 17 and the beam 10 so that by rotating the hand wheel 18 the beam 10 can be caused to rotate about the column 12. A wing nut 22 is threaded on to a bolt 23 which extends downwardly from a fixed support plate 24 through an arcuate slot 25 in the plate 17 so that as the beam 10 is rotated by turning the hand wheel 18 the bolt 23 travels along the arcuate slot 25 which is concentric with the column 12. When the chosen angular orientation of the beam 10 has been reached the wing nut 22 is tightened to lock the beam 10 in the chosen angular orientation.

A pneumatic piston and cylinder assembly 26 is housed within the hollow beam 10, the rear end of the cylinder being pivoted at 27 to a bolt 28 penetrating the beam 10 horizontally. The piston rod 29 of the assembly is fixed to a bracket 30 which extends laterally from a marker assembly 31 which has at its lower end a nozzle 32 projecting below the beam 10 and in which a spring-loaded ball valve is seated.

Similar chevron or V-shaped slots 34 and 35 are formed in corresponding positions in the opposite sidewalls of the beam 10 and these as well as the bracket 30 are penetrated by an axle 36 carrying wheels 37 and 38 which are held in the respective slots 35 and 34 by being engaged between shoulders on the axle 36 and flanged washers 39 and 40 the diameters of which are greater than the transverse widths of the slots 34 and 35.

Seated in the end of the beam 10 remote from the pneumatic cylinder is a member 41 shaped to receive and buffer the marking device 31 when the wheels 37 and 38 have reached the nearer ends of the slots 34 and 35.

The manner of use and the operation of the apparatus illustrated are as follows:

To accommodate it to pneumatic tyres of different axial thicknesses the vertical position of the beam 10 is adjusted by turning the hand wheel 13 until the beam 10 is just above the uppermost sidewall of the horizontally positioned tyre. With the wing nut 22 slackened the hand wheel 18 is operated to adjust the angular orientation of the beam 10 about the axis of the column 12 until the beam is generally tangential to the tyre sidewall, whereupon the wing nut 22 is tightened.

With the pneumatic tyre rotating in the horizontal plane the point on its uppermost sidewall to be marked by the apparatus of the invention is determined and an appropriate control signal is generated whereby compressed air is admitted to the cylinder of the assembly 26. A suitable time delay mechanism may be utilised to ensure that no error develops due to the time taken by the apparatus of the invention to respond to the control signal.

Extension of the piston out of the cylinder causes the marking device 31 to travel longitudinally of the beam to the buffer 41, and the apparatus is so arranged that this movement accompanies and is not counter to the rotational movement of the tyre.

Because of entrapment of the wheels 37 and 38 in the slots 34 and 35 the marking device 31 as it moves longitudinally of the beam 10 will also reciprocate in a direction perpendicular to the beam, the lowest position of the marker 31 being shown in chain dotted lines in FIG. 1.

The height of the beam 10 above the rotating tyre is such that at the lowest position shown the ball 33 of the marker device 31 contacts the uppermost sidewall of the tyre, unseating the ball 33 and allowing paint to flow over it onto the tyre from the reservoir within the body of the marker device 31. As soon as the ball 33 is lifted out of contact with the tyre as the wheels 37, 38 begin the up slopes of the slots 34 and 35 the spring (not shown) behind the ball 33 reseats it and cuts off the flow of paint.

By this arrangement paint does not travel through the air before reaching the tyre but is applied to it by a ball 33 which contacts it only momentarily so that an adequate amount of paint is more precisely deposited. The marker device 31 is, when the ball 33 contacts the tyre, moving in a direction similar to the sense of rotation of the tyre. By suitable operation of the pneumatic piston and cylinder assembly 26 it can be ensured that the speed of the marking device 31 longitudinally of the beam approximates the speed of rotation of the tyre. In this way relative movement between the marking device 31 and the tyre during the time they are in contact can be reduced, thus reducing the size and increasing the accuracy of the spot marked.

Having now described our invention what we claim is:

1. A method of spot-marking a rotating tire, comprising moving a marking means in a direction similar to the sense of rotation of the tire in a generally V-shaped path toward and away from the tire so as to contact the tire when changing direction along said path at the nearest point of the path to the tire.

2. A method as claimed in claim 1, wherein the tire is rotated about a vertical axis, wherein the said path is in a vertical plane tangential to the tire and wherein the marking means is maintained in a generally upright attitude throughout travel along said path.

3. Apparatus for spot-marking a pneumatic tire, comprising means for rotating the tire, marking means, support means for supporting the marking means and maintaining it in the same attitude relative to the tire, means for moving the marking means along the support means in a direction similar to the sense of rotation of the tire, and guide means on the support means for guiding the marking means, when moving along the support means, to move in a generally V-shaped path toward and away from the rotating tire.

4. Apparatus as claimed in claim 3, wherein the guidance means comprises a V-shaped slot in a beam carrying the marking means, and follower means trapped in the slot and connected to the marking means, the means for moving the marking means being adapted to displace the marking means longitudinally of the beam whereby it also moves reciprocatively transversely of the beam as the follower moves along the slot.

5. Apparatus as claimed in claim 3, wherein the marking means comprises a marking device which includes a spring-loaded ball valve arranged to be displaced when the device is brought into contact with the tire to discharge paint from a reservoir behind the ball valve.

* * * * *